(12) United States Patent
Lee et al.

(10) Patent No.: US 11,691,525 B2
(45) Date of Patent: Jul. 4, 2023

(54) SYSTEM AND METHOD OF CONTROLLING CHARGE OF VEHICLE BATTERY

(71) Applicants: HYUNDAI MOTOR COMPANY, Seoul (KR); KIA CORPORATION, Seoul (KR)

(72) Inventors: Dae Woo Lee, Incheon (KR); Jae Eun Cha, Gwangmyeong-si (KR); Byung Gu Kang, Daegu (KR); Tae Jong Ha, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/537,047

(22) Filed: Nov. 29, 2021

(65) Prior Publication Data

US 2022/0080846 A1 Mar. 17, 2022

Related U.S. Application Data

(62) Division of application No. 16/746,082, filed on Jan. 17, 2020, now Pat. No. 11,214,158.

(30) Foreign Application Priority Data

Jul. 11, 2019 (KR) .................. 10-2019-0083879

(51) Int. Cl.
*B60L 53/22* (2019.01)
*H02M 3/335* (2006.01)
*H02J 7/00* (2006.01)

(52) U.S. Cl.
CPC ............ *B60L 53/22* (2019.02); *H02J 7/0013* (2013.01); *H02M 3/33576* (2013.01); *B60L 2210/30* (2013.01); *B60L 2210/40* (2013.01); *H02J 2207/20* (2020.01)

(58) Field of Classification Search
CPC .. B60L 53/22; B60L 2210/30; B60L 2210/40; B60L 53/11; B60L 53/20; B60L 58/20; B60L 53/24; B60L 2240/527; B60L 2240/547; H02J 7/0013; H02J 2207/20; H02J 7/342; H02J 7/02; H02M 3/33576; H02M 1/0058; H02M 1/008; H02M 1/007; H02M 3/156; H02M 3/33584; H02M 3/28;

(Continued)

(56) References Cited

U.S. PATENT DOCUMENTS

| 2013/0134935 | A1 | 5/2013 | Maitra et al. | |
| 2019/0263387 | A1* | 8/2019 | Hoshino | B60W 30/20 |
| 2020/0177089 | A1* | 6/2020 | Abdel-Rahman | H02M 1/36 |

FOREIGN PATENT DOCUMENTS

| KR | 20130117210 A | 10/2013 |
| KR | 101489226 B1 | 2/2015 |

* cited by examiner

*Primary Examiner* — Paul Dinh
(74) *Attorney, Agent, or Firm* — Lempia Summerfield Katz LLC

(57) ABSTRACT

A method of controlling charge of a vehicle battery includes: determining, by a control unit, whether a high voltage battery and a low voltage battery are charged in a first charging mode, a second charging mode, or a third charging mode; and charging at least one of the high voltage battery or the low voltage battery by controlling a first full-bridge circuit unit, a second full-bridge circuit unit, and a low voltage direct current (DC) converter unit based on the determined first, second or third charging mode.

3 Claims, 5 Drawing Sheets

(58) Field of Classification Search
CPC ..... Y02T 10/72; Y02T 10/70; Y02T 10/7072; Y02T 10/92; Y02T 90/14; Y02T 90/12
USPC ........................................................ 320/109
See application file for complete search history.

SYSTEM AND METHOD OF CONTROLLING CHARGE OF VEHICLE BATTERY

CROSS REFERENCE TO RELATED APPLICATION

This application is a divisional application of non-provisional U.S. patent application Ser. No. 16/746,082, filed on Jan. 17, 2020, which claims priority to and the benefit of Korean Patent Application No. 10-2019-0083879, filed on Jul. 11, 2019, the entire contents of each of which are incorporated herein by reference.

FIELD

The present disclosure relates to a system and a method of controlling charge of a vehicle battery.

BACKGROUND

The statements in this section merely provide background information related to the present disclosure and may not constitute prior art.

A system of charging a vehicle battery includes an on board charger (OBC) for charging a high voltage battery of a vehicle, and includes a low voltage DC-DC converter for charging a low voltage battery using power of the high voltage battery. As such, the conventional charging system of the vehicle battery necessarily uses the on board charger and the low voltage DC-DC converter for driving the vehicle.

Meanwhile, as technologies to improve fuel efficiency of a vehicle, reduce manufacturing cost, and further improve utilization of a limited space of the vehicle are developed in all technical fields of the vehicle, the above-described technology development research is also actively being conducted in the field of the charging system of the vehicle battery. Among them, in order to improve the fuel efficiency of the vehicle, reduce the manufacturing cost, and further improve the utilization of the limited space of the vehicle, research for reducing the size of power elements and devices in the vehicle including the on board charger, the low voltage DC-DC convert, and the like is actively being conducted.

SUMMARY

The present disclosure provides a system and a method of controlling charge of a vehicle battery capable of improving fuel efficiency of a vehicle, reducing manufacturing cost, and further improving utilization of limited space of the vehicle by integrating an on board charger and a low voltage DC-DC converter.

According to one form of the present disclosure, a system of controlling charge of a vehicle battery of a vehicle in which a high voltage battery and a low voltage battery are mounted, includes: a first full-bridge circuit unit configured to convert direct current (DC) power which is input externally into alternating current (AC) power and configured to output the AC power; a second full-bridge circuit unit configured to: convert the AC power output from the first full-bridge circuit unit into the DC power to charge the high voltage battery, or convert the DC power input from the high voltage battery into the AC power to output the AC power; a low voltage DC converter unit including: a rectifying unit configured to rectify the AC power output by the first full-bridge circuit unit or the second full-bridge circuit unit, a smoothing unit configured to smooth power output from the rectifying unit, and a voltage converting unit configured to convert a voltage output from the smoothing unit to charge the low voltage battery; and a control unit configured to control the first full-bridge circuit unit, the second full-bridge circuit unit, and the low voltage DC converter unit based on charging modes of the high voltage battery and the low voltage battery.

In another form, the system of controlling charge of a vehicle battery may further include a transformer configured to: convert the AC power received from the first full-bridge circuit unit via an input terminal of the transformer, output the converted AC power via a first output terminal of the transformer so as to charge the high voltage battery, and output the converted AC power via a second output terminal of the transformer so as to charge the low voltage battery. In particular, the first full-bridge circuit unit includes first to fourth switching elements, and the second full-bridge circuit unit includes fifth to eighth switching elements and a first capacitor.

In another form, the rectifying unit may be a full-wave rectifying circuit configured to full-wave rectify the AC power received from the second output terminal and include a first diode and a second diode which are connected to the second output terminal and connected in parallel to each other. The smoothing unit may be located between the rectifying unit and the voltage converting unit, and include: a second capacitor and a ninth switching element connected in series with the second capacitor. In one form, the smoothing unit may smooth the voltage which is full-wave rectified through the rectifying unit, and the voltage converting unit may include a tenth switching element connected in series with the low voltage battery, an inductor connected in series with the tenth switching element, a third capacitor connected in parallel to the tenth switching element, and a third diode connected in parallel to the third capacitor.

The control unit may control the first to tenth switching elements based on a first charging mode in which the high voltage battery and the low voltage battery are simultaneously charged by external power input from the outside, a second charging mode in which only the high voltage battery is charged by the external power input, and a third charging mode in which the low voltage battery is charged by the power input from the high voltage battery.

In the first charging mode, the control unit may control the switching frequency of the first to eighth switching elements to activate the first to eighth switching elements to charge the high voltage battery, and may charge the low voltage battery by turning on the ninth switching element to smooth the voltage which is full-wave rectified by the rectifying unit through the second capacitor and controlling the switching frequency of the tenth switching element to vary the smoothed voltage.

In the second charging mode, the control unit may control the switching frequency of the first to eighth switching elements to activate the first to eighth switching elements to charge the high voltage battery, and may turn off the ninth switching element and the tenth switching element.

In the third charging mode, the control unit may inactivate the first to fourth switching elements, control the switching frequency of the fifth to eighth switching elements, convert the DC power input from the high voltage battery into the AC power, and output the AC power to the second output terminal, and may allow the low voltage battery to be charged by the power input from the high voltage battery by turning off the ninth switching element and turning on the tenth switching element.

According to another form of the present disclosure, a method of controlling charge of a vehicle battery using the system of controlling charge of a vehicle battery, includes: determining, by the control unit, whether the high voltage battery and the low voltage battery are charged in a first charging mode, a second charging mode, or a third charging mode; and charging at least one of the high voltage battery or the low voltage battery by controlling the first full-bridge circuit unit, the second full-bridge circuit unit, and the low voltage DC converter unit based on the determined first, second or third charging mode.

When it is determined that the mode is the first charging mode, the control unit may control the switching frequency of the first to eighth switching elements to activate the first to eighth switching elements to charge the high voltage battery, and may charge the low voltage battery by turning on the ninth switching element to smooth the voltage which is full-wave rectified by the rectifying unit through the second capacitor and controlling the switching frequency of the tenth switching element to vary the smoothed voltage.

When it is determined that the mode is the second charging mode, the control unit may control the switching frequency of the first to eighth switching elements to activate the first to eighth switching elements to charge the high voltage battery, and may turn off the ninth switching element and the tenth switching element.

When it is determined that the mode is the third charging mode, the control unit may inactivate the first to fourth switching elements, control the switching frequency of the fifth to eighth switching elements, convert the DC power input from the high voltage battery into the AC power, and output the AC power to the second output terminal, and may charge the low voltage battery with the power input from the high voltage battery by turning off the ninth switching element and turning on the tenth switching element.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
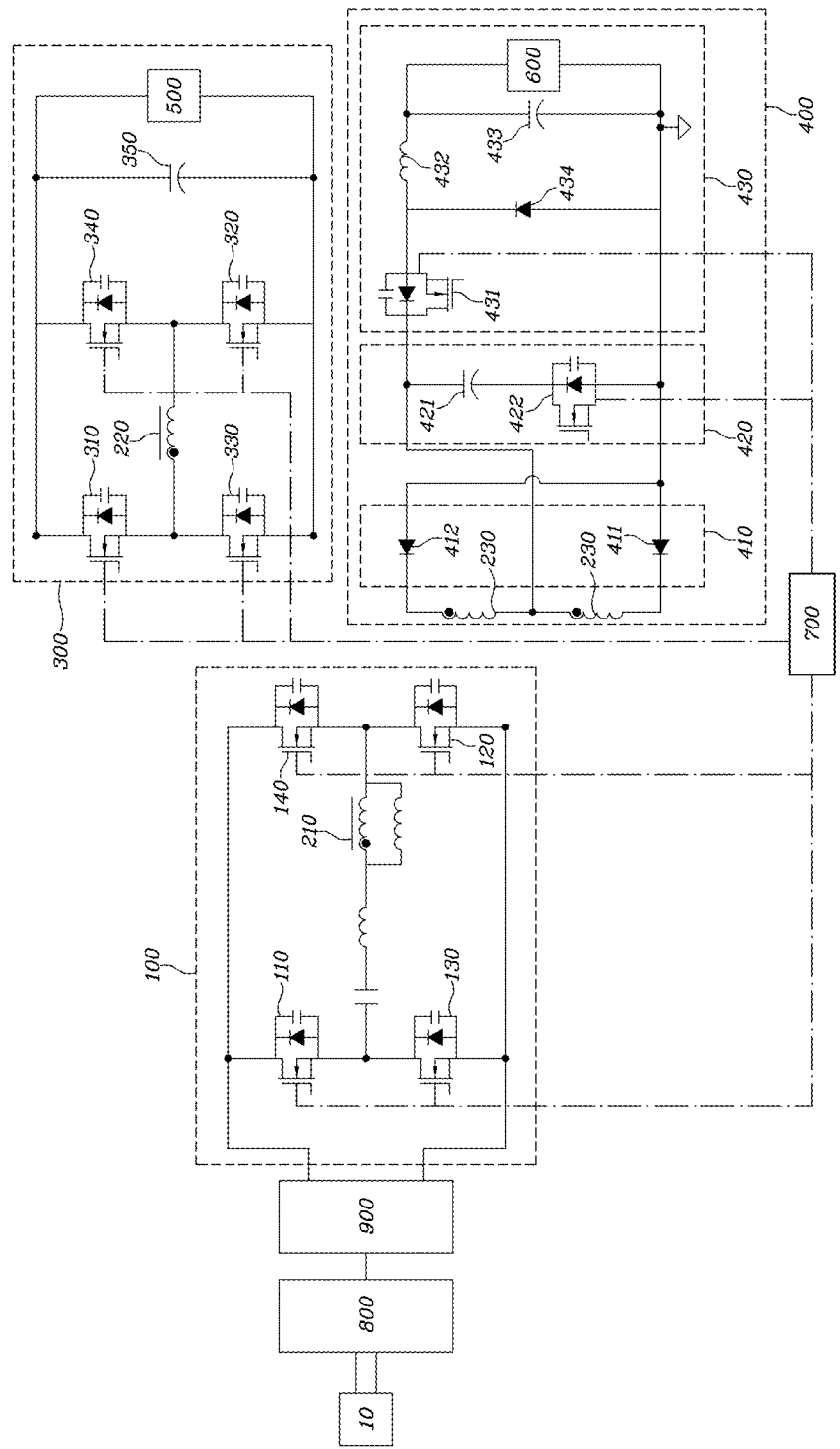
FIG. 1 is a view illustrating a circuit diagram of a system of controlling charge of a vehicle battery.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a system and a method of controlling charge of a vehicle battery according to exemplary forms of the present disclosure will be described with reference to the accompanying drawings.

Figure 2:
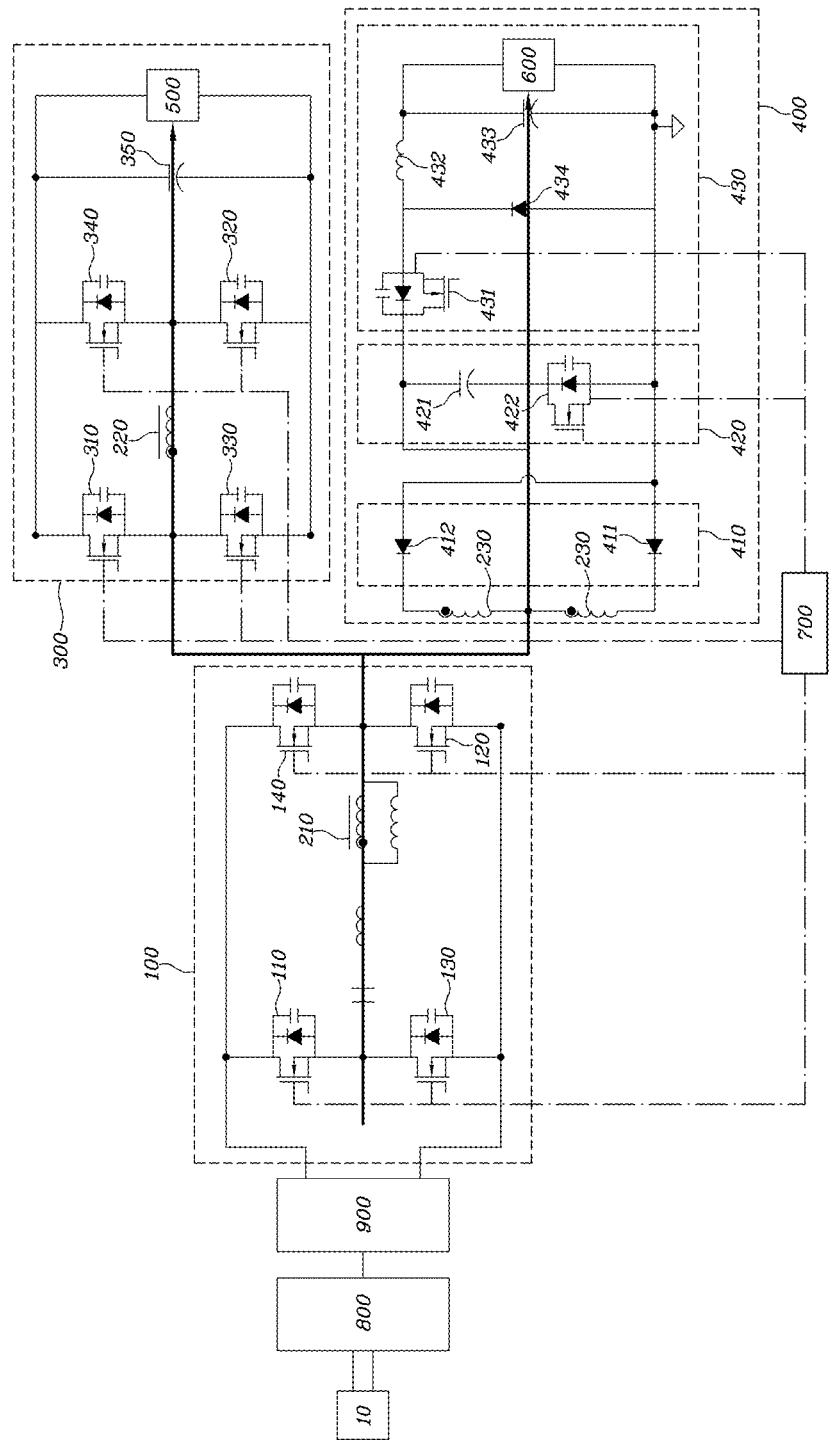
FIG. 2 is a view illustrating a circuit operation in a first charging mode, in the system of controlling charge of a vehicle battery.
Figure 3:
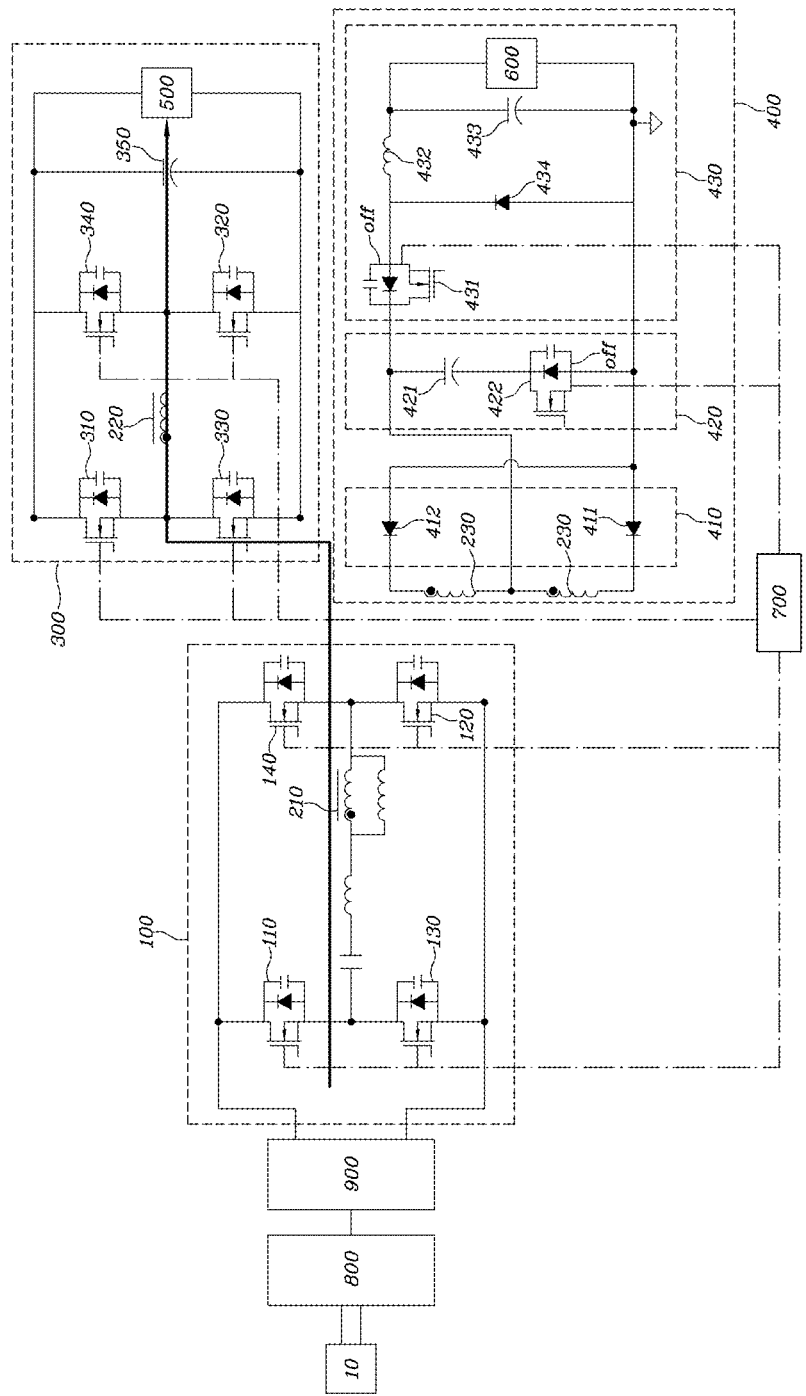
FIG. 3 is a view illustrating a circuit operation in a second charging mode, in the system of controlling charge of a vehicle battery.
Figure 4:
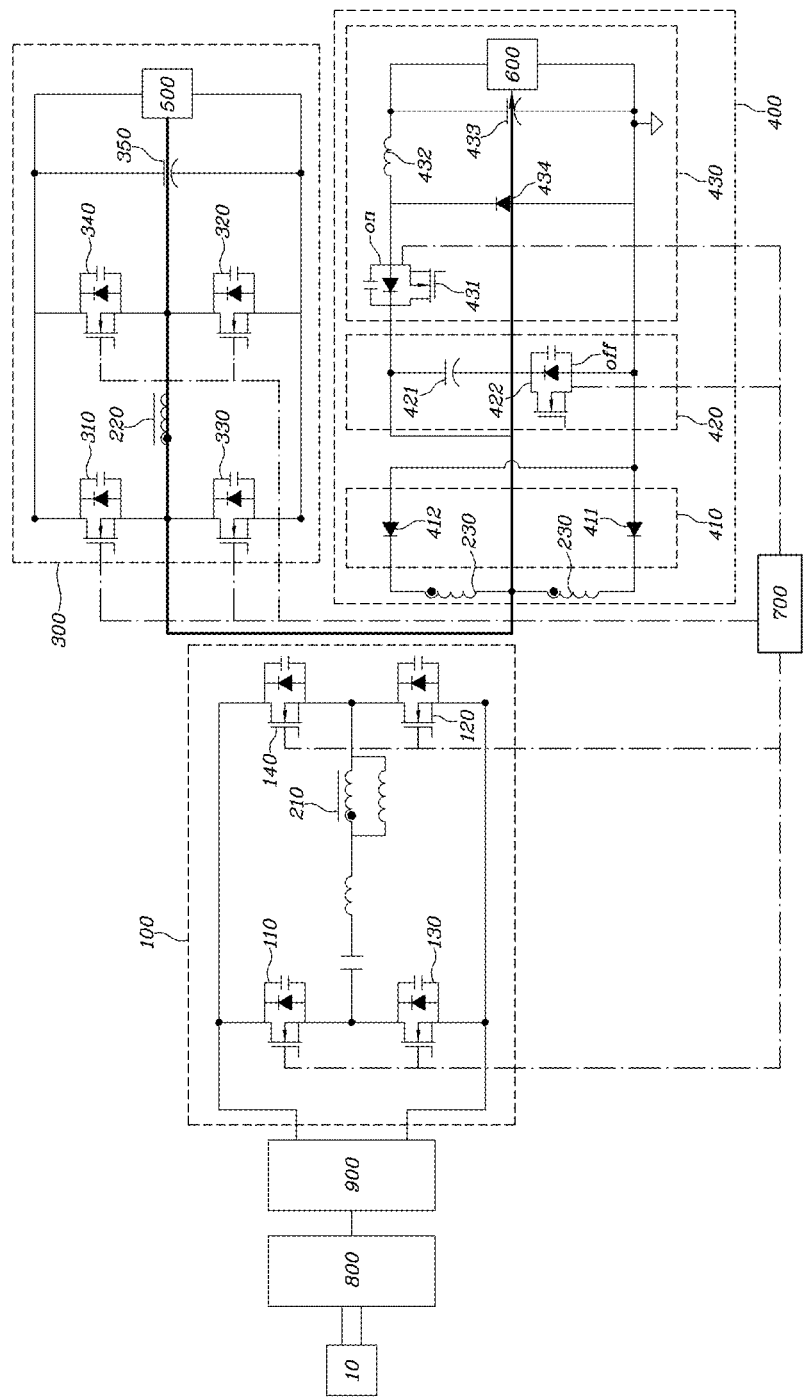
FIG. 4 is a view illustrating a circuit operation in a third charging mode, in the system of controlling charge of a vehicle battery.

FIG. 1 is a view illustrating a circuit diagram of a system of controlling charge of a vehicle battery according to an exemplary form of the present disclosure, FIG. 2 is a view illustrating a circuit operation in a first charging mode, in the system of controlling charge of a vehicle battery according to an exemplary form of the present disclosure, FIG. 3 is a view illustrating a circuit operation in a second charging mode, in the system of controlling charge of a vehicle battery according to an exemplary form of the present disclosure, and FIG. 4 is a view illustrating a circuit operation in a third charging mode, in the system of controlling charge of a vehicle battery according to an exemplary form of the present disclosure.

Referring to FIG. 1, a system of controlling charge of a vehicle battery according to an exemplary form of the present disclosure may include: a first full-bridge circuit unit 100, a second full-bridge circuit unit 300, a low voltage direct current (DC) converter unit 400, and a control unit 500. Further, the system of controlling the charge of the vehicle battery may further: include a transformer 200, a rectification circuit unit 800 that is supplied with alternating current (AC) power from an external power supply 10 to rectify the AC power, and a power factor improvement circuit unit 900 that improves a power factor of the power rectified by the rectification circuit unit 800 and transfers the improved power factor to the first full-bridge circuit unit 100.

Specifically, the first full-bridge circuit unit 100 may convert direct current (DC) power which is input from the outside into AC power and output the AC power. According to an exemplary form, the first full-bridge circuit unit 100 may include: a first switching element 110, a second switching element 120, a third switching element 130, and a fourth switching element 140. Further, the first full-bridge circuit unit 100 may convert the DC power transferred from the power factor improvement circuit unit 900 into the AC power and output the AC power. According to an exemplary form, the switching elements may be metal-oxide semiconductor field effect transistors (MOSFETs), but are not limited thereto.

Specifically, a switching frequency of the first switching element 110, the second switching element 120, the third switching element 130, and the fourth switching element 140 included in the first full-bridge circuit unit 100 may be controlled by a control unit 700 to be described later. That is, the control unit 700 may convert the DC power transferred from the power factor improvement circuit unit 900 into the AC power and output the AC power by controlling the switching frequency of the first switching element 110, the second switching element 120, the third switching element 130, and the fourth switching element 140.

The transformer 200 may include an input terminal 210 to which the AC power output from the first full-bridge circuit unit 100 is input, a first output terminal 220 of outputting the AC power which is input to the input terminal 210 and is converted and charging a high voltage battery 500, and a second output terminal 230 of outputting the AC power which is input to the input terminal 210 and is converted to a low voltage battery 600 and charging the low voltage battery.

Meanwhile, in the conventional system of controlling the charge of the vehicle battery in which the high voltage battery and the low voltage battery are mounted, as a transformer of a on board charger and a transformer of a low voltage DC-DC converter separately exist, there was a problem that a size of the system increases, a weight increases, and a limited space of the vehicle is not used efficiently. In order to solve such a problem, the transformer 200 according to the present disclosure is a transformer formed by integrating the transformer of the on board charger and the transformer of the low voltage DC-DC converter, and may output the AC power output from the first full-bridge circuit unit 100 input to the input terminal 210 through the first output terminal 220 to charge the high voltage battery 500, and output the AC power through the second output terminal 230 to charge the low voltage battery 600, thereby reducing an overall size of the system, improving space utilization of the vehicle, and improving fuel efficiency of the vehicle due to reduction in overall weight.

The second full bridge circuit unit 300 may convert the AC power output from the first full-bridge circuit unit 100 into the DC power to charge the high voltage battery 500, or convert the DC power input from the high voltage battery 500 into the AC power to output the AC power. According to an exemplary form, the second full-bridge circuit unit 300 may include a fifth switching element 310, a sixth switching element 320, a seventh switching element 330, an eighth switching element 340, and a first capacitor 350. Further, the second full-bridge circuit unit 300 may convert the AC power output from the first output terminal 220 of the transformer 200 into the DC power to output the DC power to the high voltage battery 500, or convert the DC power input from the high voltage battery 500 into the AC power to output the AC power through the first output terminal 220.

Meanwhile, a switching frequency of the fifth switching element 310, the sixth switching element 320, the seventh switching element 330, and the eighth switching element 340 included in the second full-bridge circuit unit 300 may be controlled by a control unit 700 to be described later. That is, the control unit 700 may convert the DC power input from the high voltage battery 500 into the AC power and output the AC power to the first output terminal 220 by controlling the switching frequency of the fifth switching element 310, the sixth switching element 320, the seventh switching element 330, and the eighth switching element 340, and the output power may be output to the low voltage battery 600 through the second output terminal 230.

Further, the AC power output from the first output terminal 220 may be smoothed into the DC power through the first capacitor 350 connected in parallel to the high voltage battery 500 to charge the high voltage battery 500.

The low voltage DC converter unit 400 may include a rectifying unit 410 of rectifying the AC power output by the first full-bridge circuit unit 100 or the second full-bridge circuit unit 300, a smoothing unit 420 of smoothing power output from the rectifying unit 410, and a voltage converting unit 430 of converting a voltage output from the smoothing unit 420 to charge the low voltage battery 600.

Specifically, referring to FIG. 1, the rectifying unit 410 may include a first diode 411 and a second diode 412 which are connected to the second output terminal 230 and connected in parallel to each other. Further, the rectifying unit 410 may be a full-wave rectifying circuit for full-wave rectifying the AC power output from the second output terminal 230.

In one form, the smoothing unit 420 may be located between the rectifying unit 410 and the voltage converting unit 430. Further, the smoothing unit 420 includes a second capacitor 421 and a ninth switching element 422 connected in series with the second capacitor 421, and serves to smooth the voltage which is full-wave rectified through the rectifying unit 410.

In one form, the smoothing unit 420 is positioned between the rectifying unit 410 and the voltage converting unit 430 to inhibit or prevent a switching frequency of a tenth switching element 431 from being influenced by the switching frequency controlling the switching elements included in the first full-bridge circuit unit 100 at the time of controlling the switching frequency of the tenth switching element 431 for buck driving in the voltage converting unit 430, by smoothing the full-wave rectified power before the power output from the second output terminal 230 and full-wave rectified is transferred to the voltage converting unit 430.

When it is assumed that the control unit 700 controls the switching elements included in the first full-bridge circuit unit 100 with a switching frequency of 100 kHz, the power which is full-wave rectified through the rectifying unit 410 has a switching frequency of 200 kHz. In this case, if the smoothing unit 420 transfers the power which is full-wave rectified through the rectifying unit 410 to the voltage converting unit 430 without smoothing, the tenth switching element 431 included in the voltage converting unit 430 needs to be controlled with the switching frequency of 200 kHz. As a result, there is a problem that a large load is applied to the corresponding element and the corresponding element may be damaged. According to one form of the present disclosure, in order to solve the above-mentioned problem, the power which is full-wave rectified through the rectifying unit 410 is smoothed by the smoothing unit 420 and is then transferred to the voltage converting unit 430, such that the voltage converting unit 430 efficiently controls the switching frequency of the tenth switching element 431 regardless of the control of the switching frequency of the switching elements included in the first full-bridge circuit unit 100, thereby making it possible to convert the voltage to charge the low voltage battery 600.

The voltage converting unit 430 may include the tenth switching element 431 connected in series with the low voltage battery 600, an inductor 432 connected in series with the tenth switching element 431, a third capacitor 433 connected in parallel to the tenth switching element, and a third diode 434 connected in parallel to the third capacitor 433. The voltage converting unit 430 is a general buck converter, and converts the DC power which is smoothed through the smoothing unit 420 into the AC power through the control of the tenth switching element 431 and then smoothes the AC power through the inductor 432 and the third capacitor 433 to thereby charge the low voltage battery 600. As described above, the voltage converting unit 430 is a well-known buck converter, and since the voltage is converted in the voltage converter 430 is a well-known technology, a detailed description thereof will be omitted.

The control unit 700 may control the first full-bridge circuit unit 100, the second full-bridge circuit unit 300, and the low voltage DC converter unit 400 according to charging modes of the high voltage battery 500 and the low voltage battery 600. Specifically, the control unit 700 serves to control the switching frequency of the first switching element to the tenth switching element included in the first full-bridge circuit unit 100, the second full-bridge circuit unit 300, and the low voltage DC converter unit 400 according to the charging modes of the high voltage battery 500 and the low voltage battery 600.

Hereinafter, circuit operations in a first charging mode, a second charging mode, and a third charging mode in the system of controlling the charge of the vehicle battery according to an exemplary form of the present disclosure will be described in detail with reference to FIGS. 2 to 4.

Here, the first charging mode is a mode in which the high voltage battery 500 and the low voltage battery 600 are simultaneously charged by power input from the outside, the second charging mode is a mode in which only the high voltage battery 500 is charged by the power input from the outside, and the third charging mode is a mode in which the low voltage battery 600 is charged by the power input from the high voltage battery 500.

The control unit 700 may control the first to tenth switching elements 110, 120, 130, 140, 310, 320, 330, 340, 422, and 431 according to the first charging mode, the second charging mode, and the third charging mode.

Referring to FIG. 2, in the first charging mode, the control unit 700 may control the switching frequency of the first to eighth switching elements 110, 120, 130, 140, 310, 320, 330, and 340 to activate the first to eighth switching elements 110, 120, 130, 140, 310, 320, 330, and 340 to thereby charge the high voltage battery 500. Further, the control unit 700 may charge the low voltage battery 600 by turning on the ninth element 422 to smooth the voltage which is full-wave rectified by the rectifying unit 410 through the second capacitor 421 and controlling the switching frequency of the tenth switching element 431 to vary the voltage smoothed by the smoothing unit 420.

Referring to FIG. 3, in the second charging mode, the control unit 700 may control the switching frequency of the first to eighth switching elements 110, 120, 130, 140, 310, 320, 330, and 340 to activate the first to eighth switching elements 110, 120, 130, 140, 310, 320, 330, and 340 to charge the high voltage battery. In this case, the control unit 700 may allow only the high voltage battery 500 to be charged by turning off the ninth switching element 422 and the tenth switching element 431.

Referring to FIG. 4, in the third charging mode, the control unit 700 may inactivate the first to fourth switching elements 110, 120, 130, and 140, control the switching frequency of the fifth to eighth switching elements 310, 320, 330, and 340, convert the DC power input from the high voltage battery 500 into the AC power, and output the AC power to the second output terminal 230. In this case, the control unit 700 may allow the low voltage battery 600 to be charged by the power input from the high voltage battery 500 by turning off the ninth switching element 422 and turning on the tenth switching element 431.

Meanwhile, the control unit according to an exemplary form of the present disclosure may be implemented through a non-volatile memory (not illustrated) configured to store algorithm configured to control the operations of various components of the vehicle or data related to software instructions reproducing the algorithm, and a processor (not illustrated) configured to perform operations described below using the data stored in the memory. Here, the memory and the processor may be implemented as separate chips. Alternatively, the memory and the processor may be implemented as a single chip integrated with each other. The processor may take the form of one or more processors.

Figure 5:
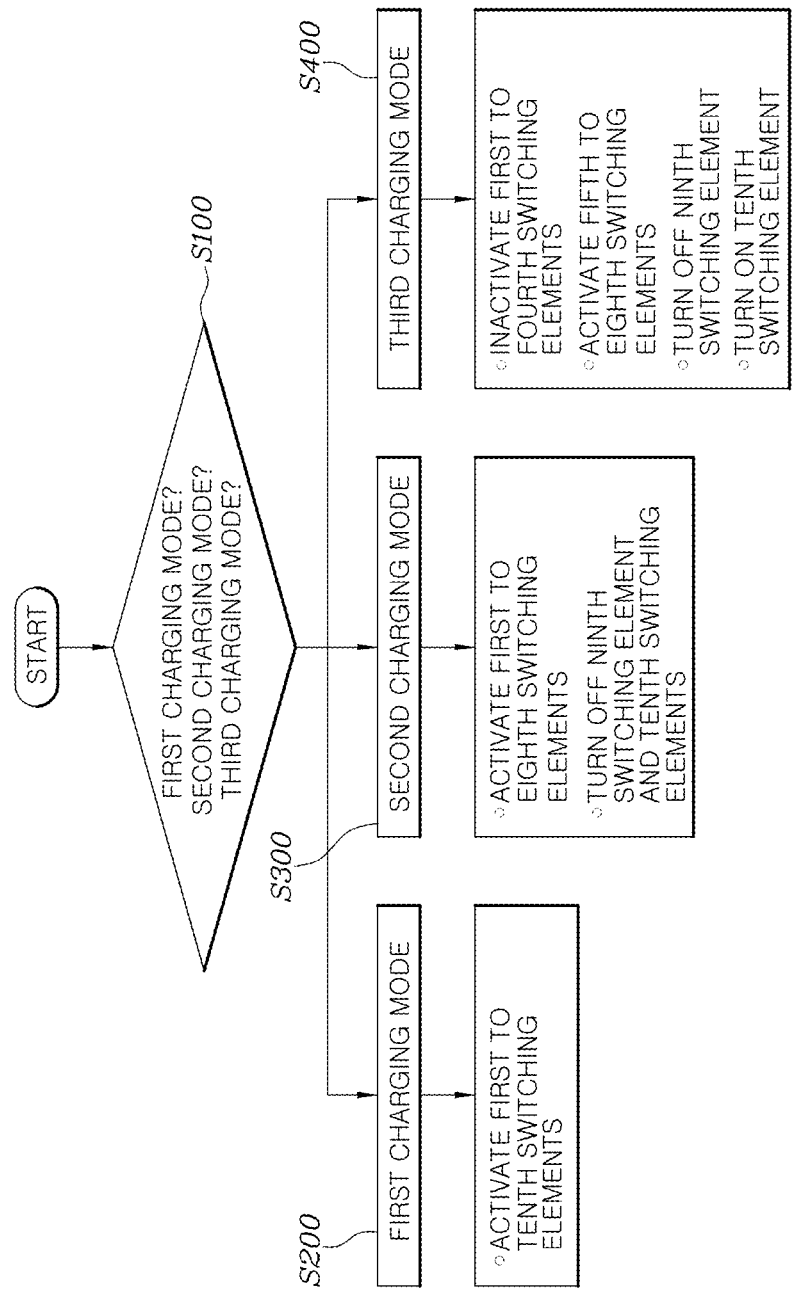
FIG. 5 is a flow chart illustrating a method of controlling charge of a vehicle battery.

Meanwhile, FIG. 5 is a view illustrating a flow chart of a method of controlling charge of a vehicle battery according to an exemplary form of the present disclosure. Referring to FIG. 5, a method of controlling charge of a vehicle battery according to an exemplary form of the present disclosure may include: an operation of determining, by the control unit, whether a mode in which the high voltage battery and the low voltage battery are charged is a first charging mode, a second charging mode, or a third charging mode, and an operation of charging at least one of the high voltage battery and the low voltage battery by controlling the first full-bridge circuit unit, the second full-bridge circuit unit, and the low voltage DC converter unit according to the determined charging mode.

Specifically, when it is determined that the mode is the first charging mode, the control unit may control the switching frequency of the first to eighth switching elements to activate the first to eighth switching elements to charge the high voltage battery, and may charge the low voltage battery by turning on the ninth element to smooth the voltage which is full-wave rectified by the rectifying unit through the second capacitor and controlling the switching frequency of the tenth element to vary the smoothed voltage.

In addition, when it is determined that the mode is the second charging mode, the control unit may control the switching frequency of the first to eighth switching elements to activate the first to eighth switching elements to charge the high voltage battery, and may allow only the high voltage battery to be charged by turning off the ninth switching element and the tenth switching element.

Further, when it is determined that the mode is the third charging mode, the control unit may inactivate the first to fourth switching elements, control the switching frequency of the fifth to eighth switching elements, convert the DC power input from the high voltage battery into the AC power, and output the AC power to the second output terminal, and may allow the low voltage battery to be charged by the power input from the high voltage battery by turning off the ninth switching element and turning on the tenth switching element.

According to the exemplary forms of the present disclosure, the fuel efficiency of the vehicle may be improved, the manufacturing cost may be reduced, and the utilization of the limited space of the vehicle may be further improved by integrating the on board charger and the low voltage DC-DC converter.

Although the present disclosure has been shown and described with respect to specific forms, it will be apparent to those having ordinary skill in the art that the present disclosure may be variously modified and altered without departing from the spirit and scope of the present disclosure.

What is claimed is:

1. A method of controlling charge of a vehicle battery, the method comprising:
   determining, by a control unit, whether a high voltage battery and a low voltage battery are charged in a first charging mode, a second charging mode, or a third charging mode;
   charging at least one of the high voltage battery or the low voltage battery by controlling a first full-bridge circuit unit, a second full-bridge circuit unit, and a low voltage direct current (DC) converter unit based on the determined first, second or third charging mode;
   when the first charging mode is determined, controlling, by the control unit, a switching frequency of first to eighth switching elements;
   activating, by the control unit, the first to eighth switching elements to charge the high voltage battery; and
   charging the low voltage battery by turning on a ninth switching element to smooth a voltage which is full-wave rectified by a rectifying unit through a second capacitor and controlling a switching frequency of a tenth switching element to vary the smoothed voltage.

2. A method of controlling charge of a vehicle battery, the method comprising:

determining, by a control unit, whether a high voltage battery and a low voltage battery are charged in a first charging mode, a second charging mode, or a third charging mode;

charging at least one of the high voltage battery or the low voltage battery by controlling a first full-bridge circuit unit, a second full-bridge circuit unit, and a low voltage direct current (DC) converter unit based on the determined first, second or third charging mode;

when the second charging mode is determined, controlling, by the control unit, a switching frequency of first to eighth switching elements;

activating the first to eighth switching elements to charge the high voltage battery; and turning off a ninth switching element and a tenth switching element.

3. A method of controlling charge of a vehicle battery, the method comprising:

determining, by a control unit, whether a high voltage battery and a low voltage battery are charged in a first charging mode, a second charging mode, or a third charging mode;

charging at least one of the high voltage battery or the low voltage battery by controlling a first full-bridge circuit unit, a second full-bridge circuit unit, and a low voltage direct current (DC) converter unit based on the determined first, second or third charging mode;

when the third charging mode is determined, inactivating, by the control unit, first to fourth switching elements;

controlling a switching frequency of fifth to eighth switching elements;

converting a DC power input from the high voltage battery into alternating current (AC) power;

outputting the AC power to a second output terminal; and charging the low voltage battery with power input from the high voltage battery by turning off a ninth switching element and turning on a tenth switching element.

* * * * *